United States Patent
Jones et al.

(10) Patent No.: US 8,366,363 B2
(45) Date of Patent: Feb. 5, 2013

(54) BLIND RIVET

(75) Inventors: Steven V. Jones, Birmingham (GB); John Davies, Birmingham (GB)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 12/899,595

(22) Filed: Oct. 7, 2010

(65) Prior Publication Data

US 2011/0027042 A1 Feb. 3, 2011

Related U.S. Application Data

(62) Division of application No. 11/890,302, filed on Aug. 3, 2007, now Pat. No. 7,824,141.

(51) Int. Cl.
*F16B 13/04* (2006.01)

(52) U.S. Cl. ............... 411/43; 411/34; 411/69; 411/500; 411/501

(58) Field of Classification Search ............ 411/34, 411/43, 69, 500–501
See application file for complete search history.

(56) References Cited

U.S. PATENT DOCUMENTS

| | | | |
|---|---|---|---|
| 1,979,686 A | 11/1934 | Hall et al. | |
| 1,996,128 A | 4/1935 | Morris | |
| 2,146,461 A * | 2/1939 | Bettington | ......... 29/512 |
| 2,183,543 A | 12/1939 | Cherry | |
| 2,328,023 A | 8/1943 | Lang | |
| 2,366,965 A | 1/1945 | Johnson | |
| 2,371,423 A | 3/1945 | Buchet | |
| 2,371,452 A | 3/1945 | Lees, Jr. | |
| 2,384,321 A | 9/1945 | Lees, Jr. | |
| 2,546,602 A | 3/1951 | Keating | |
| 2,774,098 A | 12/1956 | Tieri | |
| 2,885,798 A | 5/1959 | Wilson | |
| 3,047,181 A | 7/1962 | Heidenwolf | |
| 3,055,255 A | 9/1962 | Burrell | |
| 3,144,158 A | 8/1964 | Nouvelet | |
| 3,148,578 A | 9/1964 | Gapp | |
| 3,390,601 A | 7/1968 | Summerlin | |
| 3,424,051 A | 1/1969 | Baugh | |
| 3,426,375 A | 2/1969 | Jeal | |
| 3,438,301 A | 4/1969 | Mattioli | |
| 3,459,447 A | 8/1969 | Hurd et al. | |
| 3,460,429 A | 8/1969 | La Torre | |
| 3,491,649 A | 1/1970 | Smouton et al. | |
| 3,750,518 A | 8/1973 | Rayburn | |
| 3,835,688 A * | 9/1974 | King, Jr. | ......... 72/370.07 |
| 3,837,208 A * | 9/1974 | Davis et al. | ......... 72/370.07 |
| 3,875,649 A * | 4/1975 | King, Jr. | ............. 29/418 |

(Continued)

FOREIGN PATENT DOCUMENTS

| AT | 189858 T | 3/2000 |
|---|---|---|
| DE | 1450903 B | 5/1972 |

(Continued)

OTHER PUBLICATIONS

"Assembly Directory & Handbook", Hitchcock Publishing Company, vol. 5, 1966, pp. 218-249.

(Continued)

*Primary Examiner* — Roberta Delisle
(74) *Attorney, Agent, or Firm* — Harness, Dickey & Pierce, P.L.C.

(57) ABSTRACT

A blind rivet assembly is provided. In another aspect, a blind rivet has ends that are received within countersinks in one or more workpieces and a mandrel head is completely pulled through the rivet without being severed from a mandrel stem. A further aspect includes a mandrel with an outwardly tapering shoulder.

25 Claims, 8 Drawing Sheets

U.S. PATENT DOCUMENTS

| | | | |
|---|---|---|---|
| 3,915,055 A | 10/1975 | Binns | |
| 3,922,586 A | 11/1975 | Buxton et al. | |
| 3,949,535 A | 4/1976 | King, Jr. | |
| 3,975,786 A | 8/1976 | Gapp et al. | |
| 4,003,288 A * | 1/1977 | Jeal | 411/70 |
| 4,044,591 A * | 8/1977 | Powderley | 72/370.07 |
| 4,137,817 A * | 2/1979 | Siebol | 411/43 |
| 4,164,807 A * | 8/1979 | King, Jr. | 29/523 |
| 4,236,429 A | 12/1980 | Dolch | |
| 4,261,245 A | 4/1981 | Mauer | |
| 4,388,031 A | 6/1983 | Rodgers | |
| 4,405,273 A | 9/1983 | Ruhl et al. | |
| 4,407,619 A | 10/1983 | Siebol | |
| 4,447,944 A | 5/1984 | Mohrman | |
| 4,466,048 A | 8/1984 | Schwab | |
| 4,473,914 A | 10/1984 | Haft | |
| 4,497,603 A | 2/1985 | Boucher et al. | |
| 4,507,706 A | 3/1985 | Trexler, Jr. | |
| 4,541,032 A | 9/1985 | Schwab | |
| 4,541,761 A | 9/1985 | Bryce, Jr. | |
| 4,585,382 A | 4/1986 | Bryce, Jr. | |
| 4,585,383 A * | 4/1986 | Kraemer | 411/38 |
| 4,620,825 A | 11/1986 | Potzas | |
| 4,659,271 A | 4/1987 | Pratt et al. | |
| 4,702,655 A | 10/1987 | Kendall | |
| 4,736,560 A | 4/1988 | Murphy | |
| 4,765,010 A * | 8/1988 | Jeal et al. | 470/11 |
| 4,781,501 A | 11/1988 | Jeal et al. | |
| 4,836,728 A | 6/1989 | Mauer et al. | |
| 4,858,067 A | 8/1989 | Rochelle et al. | |
| 4,863,325 A | 9/1989 | Smith | |
| 4,893,390 A | 1/1990 | Hoeffken | |
| 4,897,003 A | 1/1990 | Bradley et al. | |
| 4,904,133 A | 2/1990 | Wright | |
| 4,909,687 A | 3/1990 | Bradley et al. | |
| 4,929,137 A | 5/1990 | Bossenmaier | |
| 4,958,971 A | 9/1990 | Lacey et al. | |
| 4,969,785 A | 11/1990 | Wright | |
| 5,006,024 A | 4/1991 | Siebol | |
| 5,035,129 A | 7/1991 | Denham et al. | |
| 5,044,850 A | 9/1991 | Getten et al. | |
| 5,054,977 A | 10/1991 | Schultz | |
| 5,167,585 A | 12/1992 | Williams et al. | |
| 5,252,013 A | 10/1993 | Browne et al. | |
| 5,259,713 A | 11/1993 | Renner et al. | |
| 5,299,667 A | 4/1994 | Hammond | |
| 5,320,465 A | 6/1994 | Smith | |
| 5,333,980 A | 8/1994 | Pratt et al. | |
| 5,359,765 A | 11/1994 | Auriol et al. | |
| 5,378,098 A | 1/1995 | Andrews et al. | |
| 5,403,135 A | 4/1995 | Renner et al. | |
| 5,443,344 A | 8/1995 | Underwood, Jr. | |
| 5,476,350 A | 12/1995 | Kurtz et al. | |
| 5,496,140 A | 3/1996 | Gossmann et al. | |
| 5,503,510 A | 4/1996 | Golan et al. | |
| 5,551,817 A | 9/1996 | Kanie et al. | |
| 5,569,006 A | 10/1996 | Alvarado et al. | |
| 5,645,383 A | 7/1997 | Williams et al. | |
| 5,651,172 A | 7/1997 | Auriol et al. | |
| 5,658,107 A | 8/1997 | Smith et al. | |
| 5,689,873 A * | 11/1997 | Luhm | 29/525.11 |
| 5,741,099 A | 4/1998 | Aasgaard | |
| 5,743,691 A | 4/1998 | Donovan | |
| 5,759,001 A | 6/1998 | Smith et al. | |
| 5,881,989 A | 3/1999 | O'Brien et al. | |
| 5,889,648 A | 3/1999 | Heavirland et al. | |
| 5,890,693 A | 4/1999 | Do et al. | |
| 5,915,901 A | 6/1999 | Aasgaard | |
| 5,960,667 A | 10/1999 | Hylwa et al. | |
| 5,982,610 A | 11/1999 | Crawford et al. | |
| 6,004,086 A | 12/1999 | Gand et al. | |
| 6,007,287 A | 12/1999 | Toosky et al. | |
| 6,042,313 A | 3/2000 | Dehlke | |
| 6,081,984 A * | 7/2000 | Sherry | 29/432.2 |
| 6,171,038 B1* | 1/2001 | Pratt et al. | 411/43 |
| 6,224,310 B1 | 5/2001 | Summerlin et al. | |
| 6,254,324 B1 | 7/2001 | Smith et al. | |
| 6,276,050 B1 | 8/2001 | Mauer et al. | |
| 6,299,398 B1 | 10/2001 | Shinjo et al. | |
| 6,389,676 B1 | 5/2002 | Denham | |
| 6,398,472 B1 | 6/2002 | Jones et al. | |
| 6,418,599 B2 | 7/2002 | Suzuki et al. | |
| 6,428,255 B1 | 8/2002 | Smith et al. | |
| 6,443,322 B1 | 9/2002 | Braun et al. | |
| 6,445,568 B1 | 9/2002 | Baur et al. | |
| 6,461,213 B1 | 10/2002 | Volz | |
| 6,484,370 B2 | 11/2002 | Kanie et al. | |
| 6,502,008 B2 | 12/2002 | Maurer et al. | |
| 6,553,622 B2 | 4/2003 | Maruyama et al. | |
| 6,637,995 B1 | 10/2003 | White | |
| 6,746,192 B2 | 6/2004 | Eshraghi | |
| 6,751,841 B2 * | 6/2004 | Schnabel et al. | 29/524.1 |
| 6,754,066 B2 | 6/2004 | Doan et al. | |
| RE38,664 E | 11/2004 | Luhm | |
| 6,826,820 B2 * | 12/2004 | Denham et al. | 29/524.1 |
| 6,854,940 B2 | 2/2005 | Jennings et al. | |
| 6,877,204 B1 | 4/2005 | Schnabel et al. | |
| 6,881,898 B2 | 4/2005 | Baker et al. | |
| 6,898,918 B2 | 5/2005 | Eshraghi | |
| 6,905,296 B2 | 6/2005 | Millington et al. | |
| RE39,582 E | 4/2007 | Luhm | |
| 2001/0005475 A1 | 6/2001 | Frigg | |
| 2003/0082025 A1 | 5/2003 | Luhm | |
| 2004/0022597 A1 | 2/2004 | Jones et al. | |
| 2004/0071522 A1 | 4/2004 | Millington | |
| 2004/0071525 A1 | 4/2004 | Millington | |
| 2004/0247414 A1 | 12/2004 | Pearce et al. | |
| 2005/0100423 A1 | 5/2005 | Summerlin | |
| 2005/0214094 A1* | 9/2005 | Summerlin | 411/43 |
| 2006/0251490 A1 | 11/2006 | Kleinman et al. | |
| 2007/0154277 A1 | 7/2007 | Smith et al. | |

FOREIGN PATENT DOCUMENTS

| | | |
|---|---|---|
| DE | 3612501 A1 | 10/1987 |
| DE | 4003136 | 8/1991 |
| EP | 0251700 A2 | 1/1988 |
| EP | 0635647 A1 | 1/1995 |
| EP | 0841491 A1 | 5/1998 |
| FR | 724509 A | 4/1932 |
| FR | 1494693 | 9/1967 |
| FR | 1553116 | 1/1969 |
| GB | 642664 | 9/1950 |
| GB | 1066033 | 4/1967 |
| GB | 1183049 | 3/1970 |
| GB | 1495592 | 12/1977 |
| GB | 1572269 | 7/1980 |
| GB | 2371344 A | 7/2002 |
| JP | 62155318 A | 7/1987 |
| JP | 63001808 A | 1/1988 |
| JP | 3048106 A | 3/1991 |
| JP | H03-48106 U | 5/1991 |
| JP | 05335756 A | 12/1993 |
| JP | 7012112 A | 1/1995 |
| JP | 8-086304 A | 4/1996 |
| JP | 11284357 A | 10/1999 |
| JP | 2000277947 A | 10/2000 |
| NL | 99009 C | 8/1961 |
| WO | WO-98/23872 A1 | 6/1998 |
| WO | WO-2006/128652 A1 | 12/2006 |

OTHER PUBLICATIONS

"Design Considerations for Blind Fasteners," 'OEM Design', Jul. 1992 (2 pages).

2 drawings of Briv blind rivet (published by another prior to Aug. 2007), 1 page.

Avdel, Animation of Avdel—Speed Fastening Systems: Briv series (published before Aug. 2007), 5 pages.

BRIV.RTM. Fastening Systems—Product Information brochure published Jan. 1997 (4 pages).

Brochure entitled "Cherry Commercial Products—Cherry C. Rivets", (published prior to 2002), 6 pages.

CHOBERT.RTM. Fastening Systems—Product Information brochure published Jan. 1997 (4 pages).

Mark P. Spector, "AE Blind Riveting of Plastics," 'Design/Fastening/Joining', believed to have been published before 2002 (4 pages).

Paul A. Gustafson et al. "For Special Applications: Special Blind Rivets", 'AE Design/Fastening/Joining', Aug. 1979 (3 pages).

Photograph of Emhart blind rivet Part No. 14021 (believed to have been publicly used prior to May 2002).

Photograph of Emhart blind rivet Part No. 14045 (believed to have been publicly used prior to May 2002).

Photograph of Emhart blind rivet Part No. 14046M (believed to have been publicly used prior to May 2002).

Photograph of Emhart blind rivet Part No. 14171 (believed to have been publicly used prior to May 2002).

Photograph of Emhart blind rivet Part No. 15780 (believed to have been publicly used prior to May 2002).

Photograph of Emhart blind rivet Part No. 15780M (believed to have been publicly used prior to May 2002).

Photograph of Emhart blind rivet Part No. 15891 (believed to have been publicly used prior to May 2002).

Photograph of Emhart blind rivet Part No. 16220M (believed to have been publicly used prior to May 2002).

Photograph of Emhart blind rivet Part No. 16225 (believed to have been publicly used prior to May 2002).

Photograph of Emhart blind rivet Part No. 16226 (believed to have been publicly used prior to May 2002).

Photograph of Emhart blind rivet Part No. 16289 (believed to have been publicly used prior to May 2002).

* cited by examiner

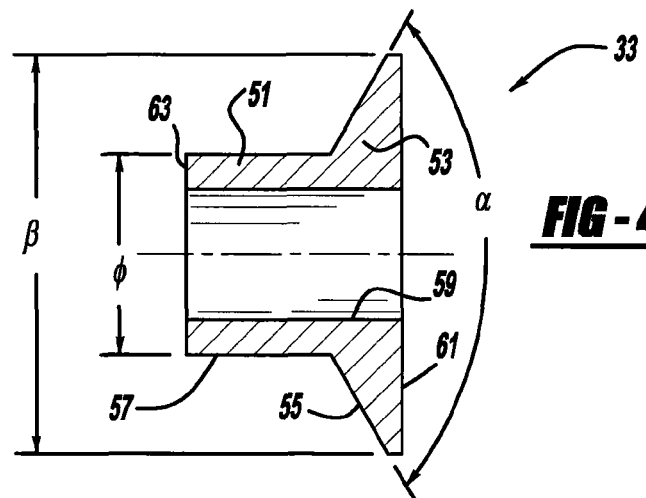
FIG-4
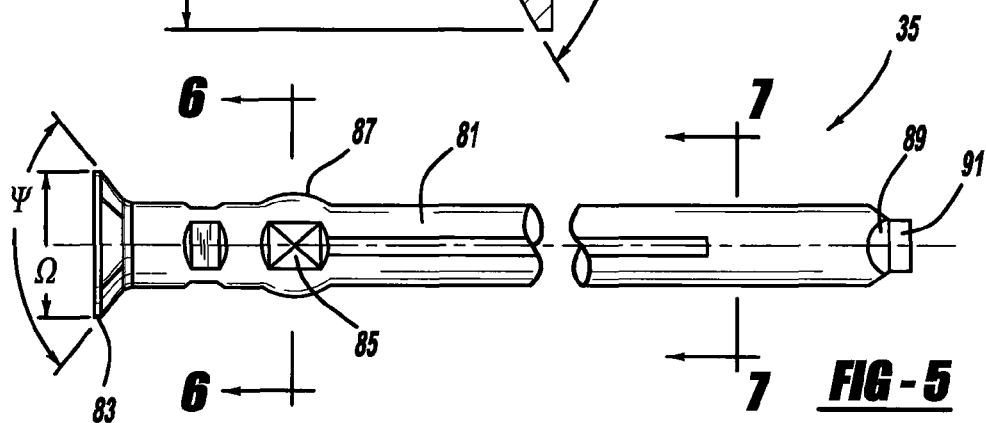
FIG-5
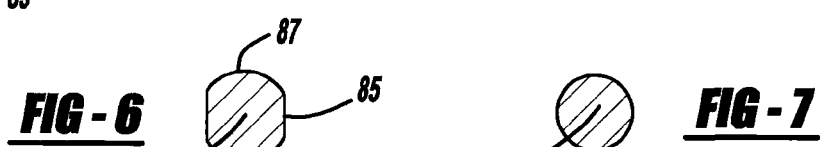
FIG-6     FIG-7
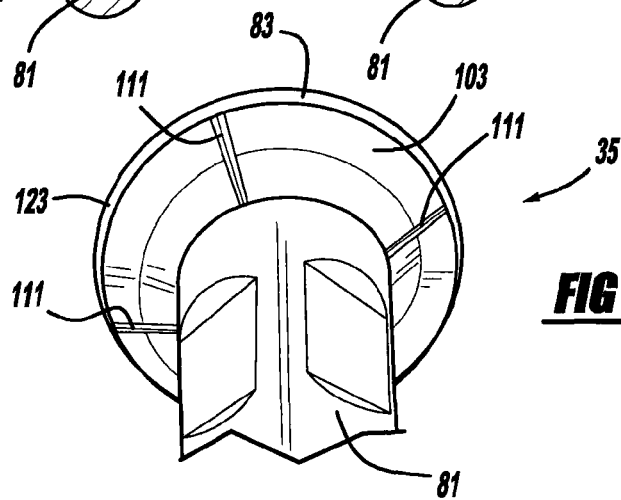
FIG-8

BLIND RIVET

CROSS-REFERENCE TO RELATED APPLICATIONS

This application is a divisional of U.S. patent application Ser. No. 11/890,302 filed on Aug. 3, 2007, and issued as U.S. Pat. No. 7,824,141. The entire disclosure of the above application is incorporated by reference herein.

BACKGROUND

The present invention generally relates to rivets and more particularly to a blind rivet assembly.

It is known to set blind rivets with a mandrel. For example, reference should be made to U.S. Pat. No. 5,689,873 entitled "Tacking Fastener" which issued to Luhm on Nov. 25, 1997, Great Britain Patent No. 286,471 entitled "Improvements in and Relating to Rivets and Riveting," and Great Britain Patent No. 2 150 661 entitled "Pull-Type Blind-Riveting Assemblies." These rivets, however, outwardly extend past outside surfaces of workpieces after rivet setting. This disadvantageously takes up too much space, and is prone to interference or damage during assembly. More recently, flush blind rivets, using breakable mandrels, have been employed. While these constructions have significantly improved the industry, further improvements are desirable.

SUMMARY

In accordance with the present invention, a blind rivet assembly is provided. In another aspect of the present invention, a blind rivet has ends that are received within countersinks in one or more workpieces and a mandrel head is completely pulled through the rivet without being severed from a mandrel stem. A further aspect of the present invention includes a mandrel with one or more ribs located on an outwardly tapering shoulder. Methods of making and setting rivets are also provided.

The present invention blind rivet is advantageous over conventional blind rivets since the ends of the present invention blind rivet are flush or below flush from the outside workpiece surfaces. This achieves a smaller packaging space for improved inner packing density of fastened components with less opportunity for snagging otherwise protruding rivet heads and flanges. Furthermore, the present invention blind rivet does not employ a broken mandrel head. Therefore, assembly is less expensive and has a higher quality since the broken heads do not have to be located after setting, and the broken heads are not loose which can cause rattling and shorting of electrical circuits. Reducing setting loads are required for the pull-through mandrel versus a breakable head mandrel, thus improving the longevity of setting tools, extending times between routine maintenance and contributing to improved productivity. Moreover, the blind rivet of the present invention advantageously is set from only one side of the workpieces. The dimensional relationships and shapes of the blind rivet and mandrel are advantageous by maximizing fastening performance on a consistent basis, for example by allowing appropriate axial compression lengths and lateral expansion size hole filling of the set blind rivet in countersunk workpieces. Additional advantages and features of the present invention will become apparent from the following description and appended claims, taken in conjunction with the accompanying drawings.

BRIEF DESCRIPTION OF THE DRAWINGS

FIG. 4 is a cross-sectional view, taken along line 2-2 of FIG. 1, showing the blind rivet employed in the preferred embodiment blind rivet assembly, prior to rivet setting;

FIG. 5 is a side elevational view showing the mandrel employed in the preferred embodiment blind rivet assembly, prior to rivet setting;

FIG. 6 is a cross-sectional view, taken along line 6-6 of FIG. 5, showing the mandrel employed in the preferred embodiment blind rivet assembly, prior to rivet setting;

FIG. 7 is a cross-sectional view, taken along line 7-7 of FIG. 5, showing the mandrel employed in the preferred embodiment blind rivet assembly, prior to rivet setting;

FIG. 8 is a fragmentary perspective view showing the mandrel employed in the preferred embodiment blind rivet assembly, prior to rivet setting;

DETAILED DESCRIPTION

Figure 1:
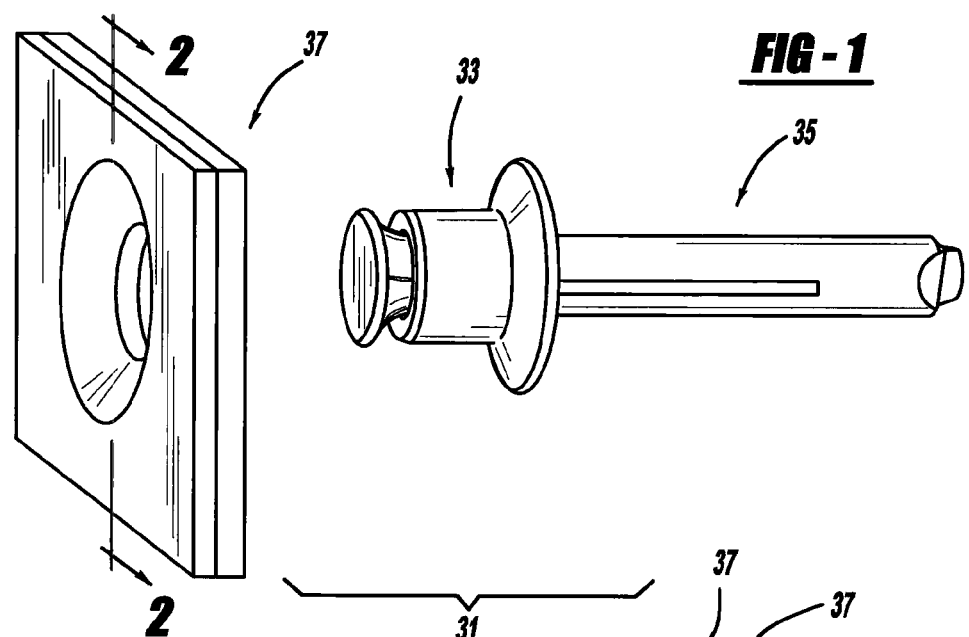
FIG. 1 is a partially exploded perspective view showing the preferred embodiment of a blind rivet assembly of the present invention, prior to rivet setting.
Figure 2:
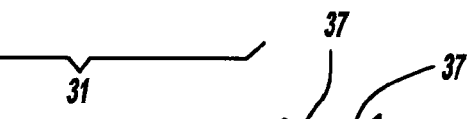
FIG. 2 is a cross-sectional view, taken along line 2-2 of FIG. 1, showing workpieces employed in the preferred embodiment blind rivet assembly, prior to rivet setting.
Figure 3:
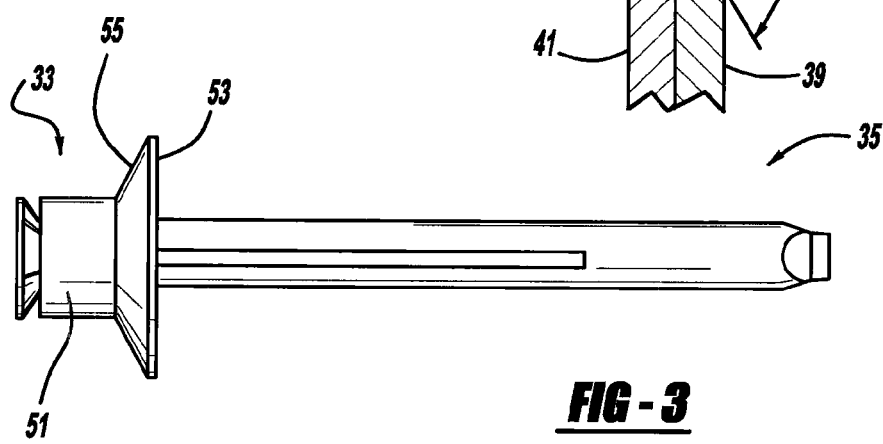
FIG. 3 is a side elevational view showing a blind rivet and mandrel employed in the preferred embodiment blind rivet assembly, prior to rivet setting.
Figure 9:
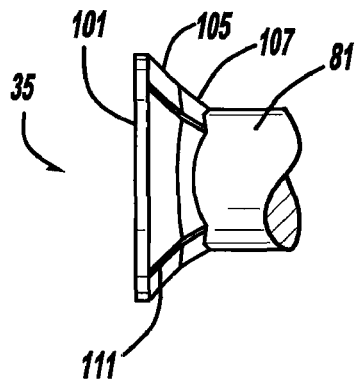
FIG. 9 is a fragmentary side elevational view showing the mandrel employed in the preferred embodiment blind rivet assembly, prior to rivet setting.

The preferred embodiment of a blind rivet assembly 31 of the present invention is shown in FIGS. 1-3. Blind rivet assembly 31 includes a blind rivet 33, a mandrel 35 and workpieces 37. Workpieces 37 are preferably component panels, boxes, cabinets or housings of electronic computer, electronic server or other such devices. Workpieces 37 include a tool-side outer surface 39 and an opposite blind-side outer surface 41 within which are countersunk depressions 43 joined by circular-cylindrical holes 45 located at the workpiece interface. Each countersink 43 has a generally frusto-conical shape with a total angle α equal to or between 120° and 90°, and more preferably between 110° and 90° total.

FIGS. 3 and 4 best illustrate blind rivet 33. Blind rivet 33 includes a body 51 and a tool-side flange 53. A frusto-conical outside surface 55 tapers along an outside of flange 53 and an outside surface 57 of body 51 has a circular-cylindrical shape. A through-bore 59 extends between a tool end face 61 and a blind or tail end 63 of blind rivet 33. Through-bore 59 has a generally constant inside diameter between ends 61 and 63 prior to rivet setting. Outside diameter β of flange 53 has a preferred dimension equal to or between 5.0 and 5.4 mm while an outside diameter φ of rivet body 51 has a dimension equal to or between 3.08 mm and 2.9 mm.

Referring to FIGS. 5-9, the preferred embodiment of mandrel 35 includes an axially elongated stem 81 and a laterally enlarged head 83. Stem 81 is predominantly circular-cylindrical but locally interrupted by various depressions 85 and adjacent protrusions 87 which assist in securing the rivet onto the mandrel during shipping and tool feeding. A chamfered end 89 and extension 91 are located at an end of stem 81 opposite head 83 so as to assist in alignment with a setting tool.

Head 83 includes a generally flat blind or tail end 101, and a shoulder 103. Shoulder 103 of the presently preferred embodiment is defined by a pair of differently angled and straight tapering surfaces 105 and 107. Tapering surfaces 105 and 107 are coaxial with each other and with stem 81. Four ribs 111 are located on shoulder 103 and are equi-distantly spaced around shoulder 103. Ribs 111 are elongated in a predominantly axially aligned direction but are offset angled essentially like shoulder 103. An outside diameter Ω of mandrel head 83 is preferably equal to or between 3.5 mm and 2.9 mm, and a nominal angle of the total mandrel shoulder is preferably equal to or between 110° and 90° prior to rivet setting. Furthermore, an axial thickness of mandrel head 83, at a lip and not including the shoulder, is preferably equal to or between 1.0 mm and 0.35 mm before rivet setting. It is preferred that outside diameter Ω of mandrel head 83 is greater than outside diameter φ of rivet body 51 to achieve proper hole filling and axial setting compression. Blind rivet 33 and mandrel 33 are also preferably made from grade SAE1006 steel.

Figure 10:
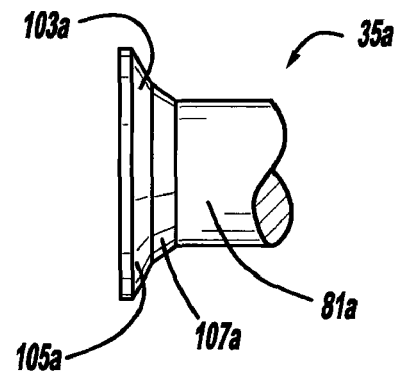
FIG. 10 is a fragmentary side elevational view showing the mandrel employed in a first alternate embodiment blind rivet assembly, prior to rivet setting.
Figure 11:
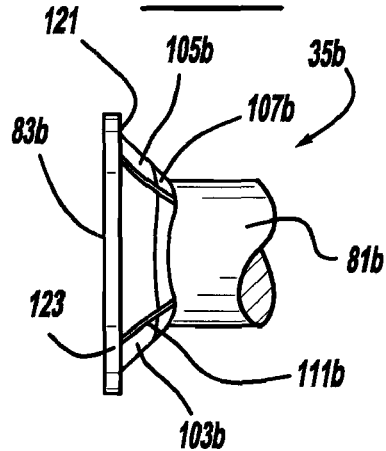
FIG. 11 is a fragmentary side elevational view showing the mandrel employed in a second alternate embodiment blind rivet assembly, prior to rivet setting.

FIG. 10 illustrates an alternate embodiment mandrel 35a like the preferred embodiment, however, shoulder 103a includes straight tapering, frusto-conical surfaces 105a and 107a, but without ribs. Another alternate embodiment mandrel 35b is shown in FIG. 11. Mandrel 35b has a shoulder 103b including straight tapered, frusto-conical surfaces 105b and 107b like that of FIG. 9, and ribs 111b also like that of FIG. 9. Nevertheless, there is an inward spacing or step 121 between an outermost portion of shoulder 103b and a lip 123 of head 83b thereby causing an overhang.

Figure 12:
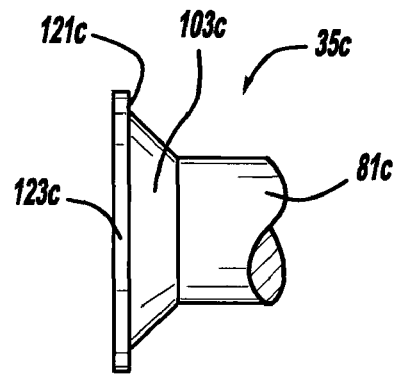
FIG. 12 is a fragmentary side elevational view showing the mandrel employed in a third alternate embodiment blind rivet assembly, prior to rivet setting.
Figure 13:
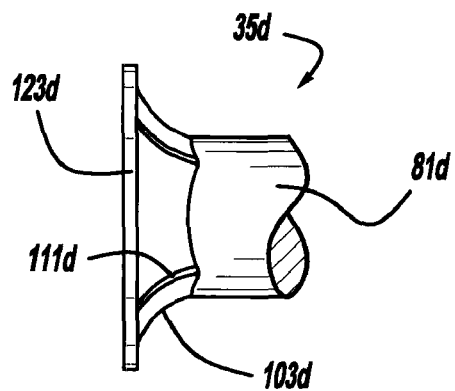
FIG. 13 is a fragmentary side elevational view showing the mandrel employed in a fourth alternate embodiment blind rivet assembly, prior to rivet setting.
Figure 14:
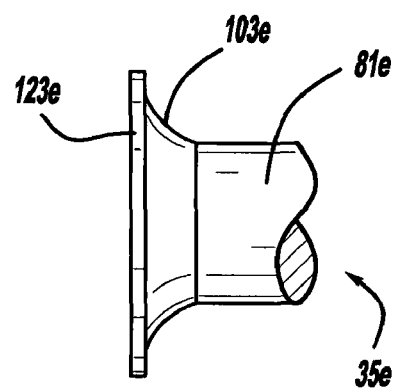
FIG. 14 is a fragmentary side elevational view showing the mandrel employed in a fifth alternate embodiment blind rivet assembly, prior to rivet setting.
Figure 15:
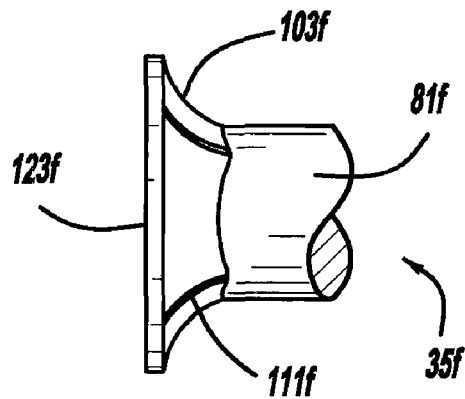
FIG. 15 is a fragmentary side elevational view showing the mandrel employed in a sixth alternate embodiment blind rivet assembly, prior to rivet setting.
Figure 16:
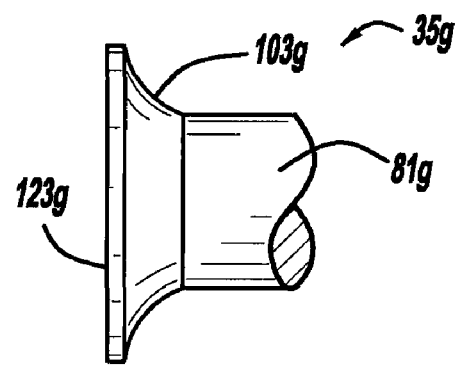
FIG. 16 is a fragmentary side elevational view showing the mandrel employed in a seventh alternate embodiment blind rivet assembly, prior to rivet setting.

Still another alternate embodiment mandrel 35c is illustrated in FIG. 12. Shoulder 103c has a single angled frusto-conical taper in addition to the stepped spacing 121c of lip 123c. No ribs are employed with this exemplary embodiment. Referring now to FIG. 13, an alternate embodiment mandrel 35d provides an arcuately curved taper at shoulder 103d, ribs 111d and inwardly stepped lip 123d. Alternate embodiment FIG. 14 has an arcuately tapered shoulder 103e, no ribs and the inward shoulder spacing relative to lip 123e. FIG. 15 employs an arcuately tapered shoulder 103f in combination with ribs 111f but no inward spacing of shoulder 103f relative to lip 123f. As can be seen in FIG. 16, another alternate embodiment mandrel 35g includes an arcuately tapered shoulder 103g but without ribs and without the inward shoulder-to-lip 123g spacing.

Figure 17:
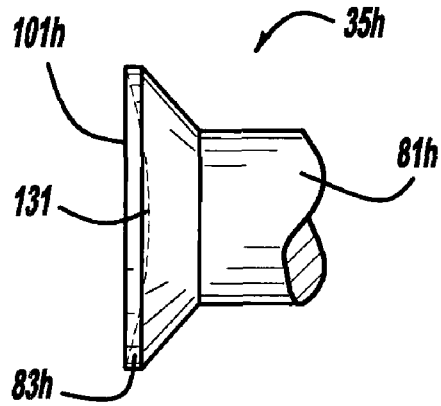
FIG. 17 is a fragmentary side elevational view showing the mandrel employed in an eighth alternate embodiment blind rivet assembly, prior to rivet setting.
Figure 18:
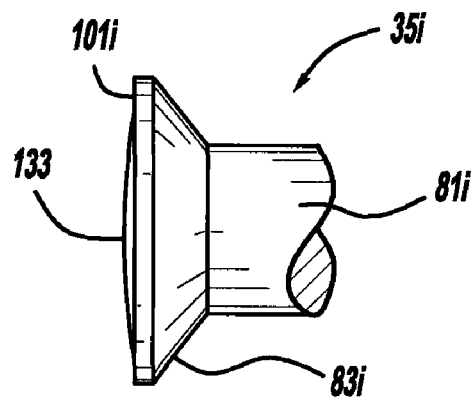
FIG. 18 is a fragmentary side elevational view showing the mandrel employed in a ninth alternate embodiment blind rivet assembly, prior to rivet setting.
Figure 19:
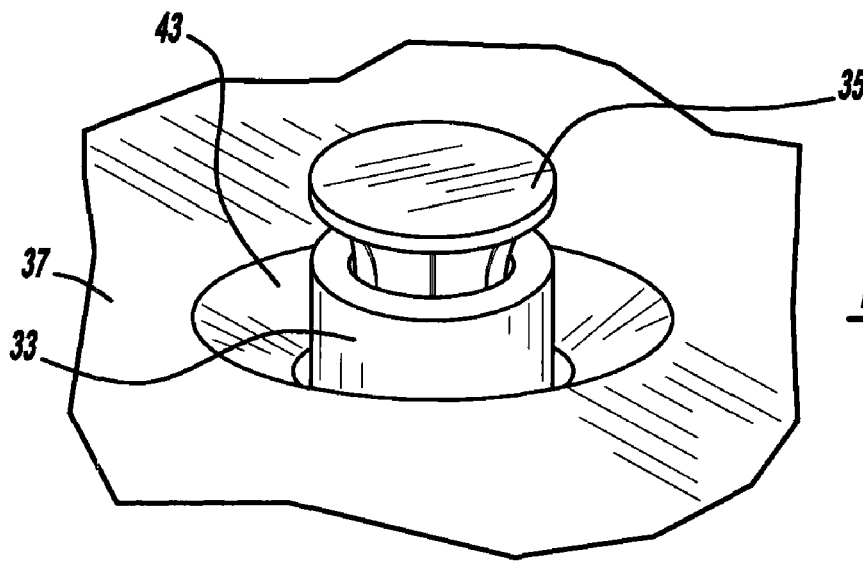
FIG. 19 is a perspective view showing the preferred embodiment blind rivet assembly protruding through the workpieces, prior to rivet setting.

Referring now to FIG. 17, an alternate embodiment mandrel 35h includes a concave curved surface 131 depressed below the nominal tail end 101h. This encourages lateral compression and folding of head 83h during rivet setting. FIG. 18 alternately shows mandrel 35i with a convex surface 133 outwardly curving from tail end 101i to change the folded characteristics of head 83i during rivet setting.

Reference should now be made to FIGS. 19-22, where the rivet setting procedures and construction will be discussed. A rivet setting tool 201 includes a piston rod 203, a jaw pusher 205, a compression spring 207 outwardly biasing the pusher 205, a set of jaws 209, a jaw case 211, an outer barrel 213 and a nose piece 215. Mandrel 35 and rivet 33 are pre-assembled together with an interference fit due to bulge 87 (see FIG. 5) prior to insertion in setting tool 201. Thereafter, stem 81 of mandrel 35 is inserted into nose piece 215 and temporarily retained by jaws 209.

Next, rivet tool is located adjacent workpieces 37 such that the blind end of the blind rivet and mandrel are inserted through the corresponding hole in workpieces 37 such that tool-side flange 53 completely fits within the adjacent countersink 43 and the tool end of blind rivet 33 is predominantly flush or below flush outside surface 39 of the tool-side workpiece. It is noteworthy that there is a slight gap between the outside surface of the rivet body and the inside diameter of the workpiece hole before rivet setting.

Figure 20:
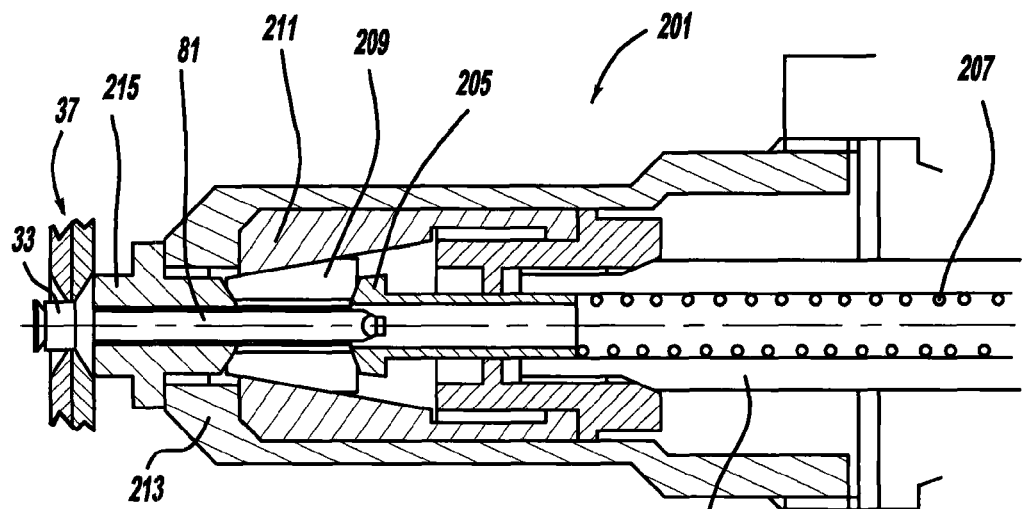
FIG. 20 is a partially cross-sectional view, taken along line 2-2 of FIG. 1, showing the preferred embodiment blind rivet assembly, including a setting tool, prior to rivet setting.
Figure 21:
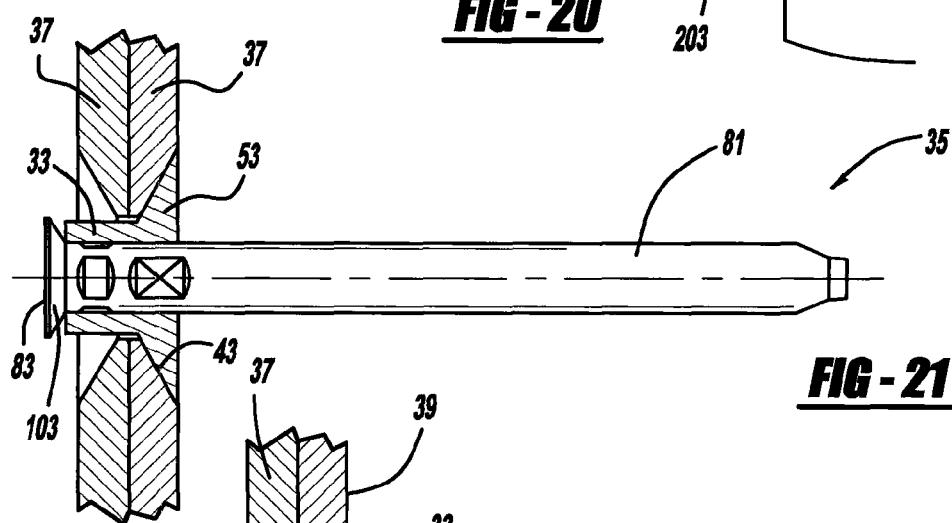
FIG. 21 is a partially cross-sectional view, taken along line 2-2 of FIG. 1, showing the preferred embodiment blind rivet assembly, prior to rivet setting.
Figure 22:
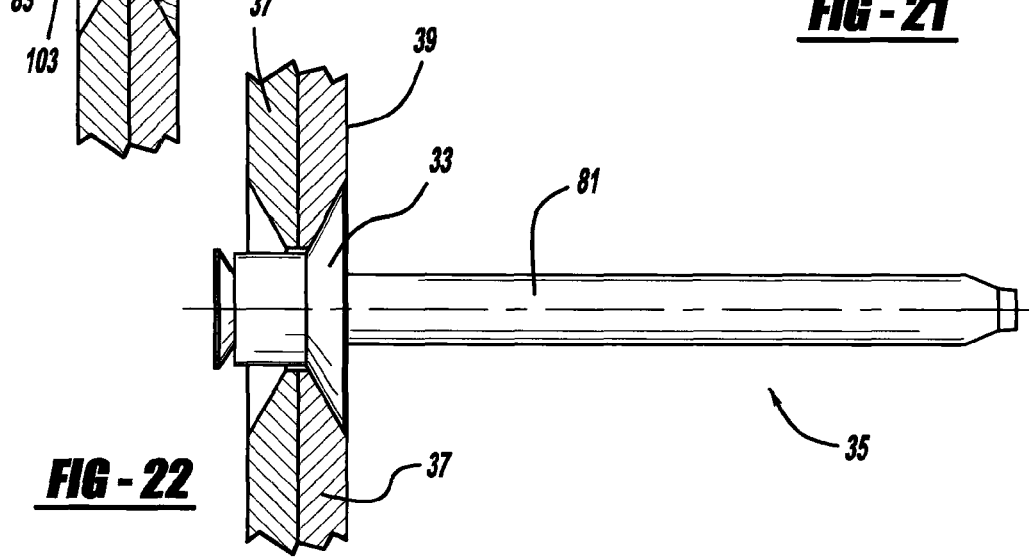
FIG. 22 is a partially fragmented, side elevational view showing the preferred embodiment blind rivet assembly, prior to rivet setting.
Figure 26:
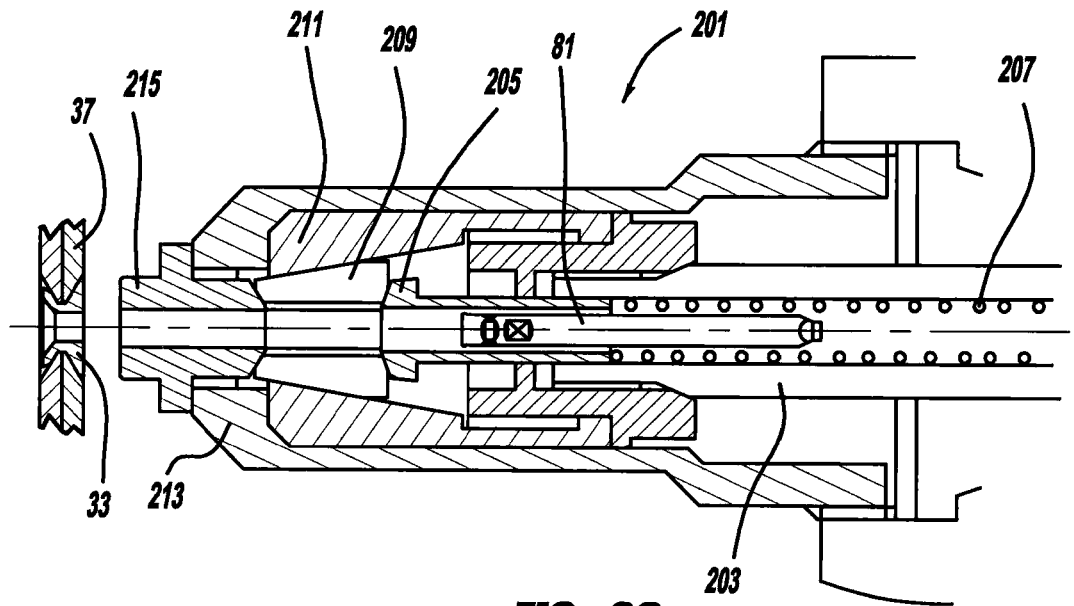
FIG. 26 is a cross-sectional view, taken along line 2-2 of FIG. 1, showing the preferred embodiment blind rivet assembly, including the setting tool, after rivet setting.
Figure 27:
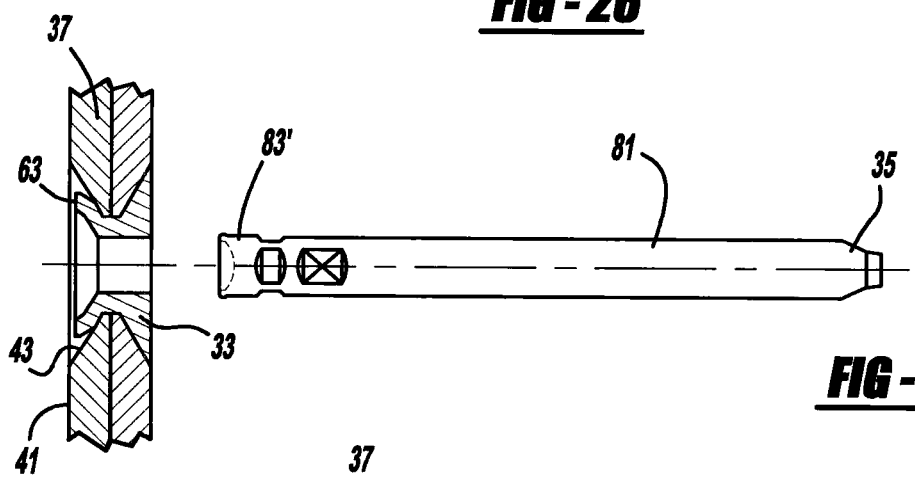
FIG. 27 is a partially cross-sectional view, taken along line 2-2 of FIG. 1, showing the preferred embodiment blind rivet assembly, after rivet setting.
Figure 28:
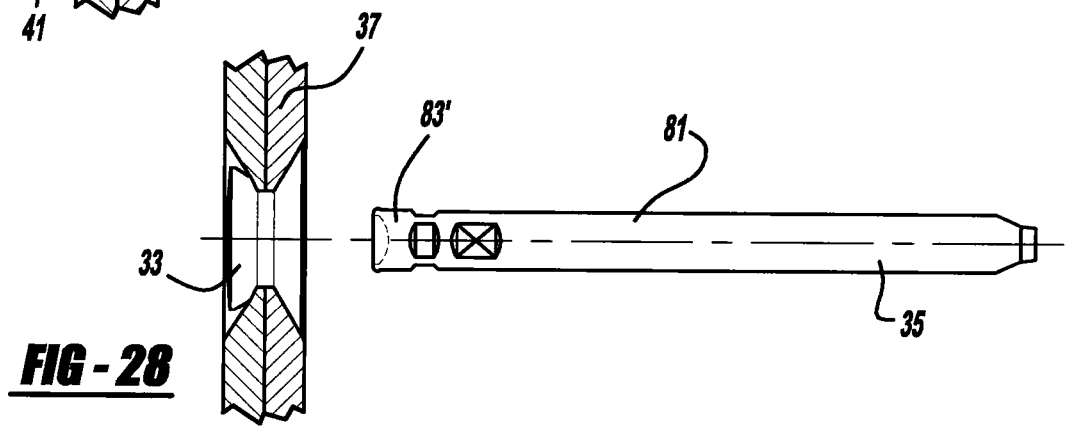
FIG. 28 is a partially fragmented, side elevational view showing the preferred embodiment blind rivet assembly, after rivet setting.

Comparing the pre-rivet setting condition of FIG. 20 to the post-rivet setting condition of FIG. 26, the stem of the mandrel is gripped between the jaws of setting tool 201 and the rivet flange is abutted by the nose piece. As the tool is activated, the piston rod is caused to retract by a piston actuator which inwardly urges the jaws due to the action of the jaw case. Approximately 1,500 newtons of force are used by the setting tool to pull the mandrel through the rivet, which is approximately 500 newtons less than necessary for breakable head-type mandrels. As the mandrel head is pulled into the rivet body, the head collapses and is pulled completely through the blind rivet without severing the mandrel head. At this stage, the power supply to the piston ceases and the piston returns to its ready state which opens the jaws, whereafter the spent mandrel is vacuum extracted into a mandrel collector bottle at the rear of the setting tool and discarded. Subsequently, the tool is then ready for the next rivet setting operation.

Referring to FIGS. 24, 25, 27 and 28, the preferred embodiment blind rivet assembly is shown in the set and fully installed condition. Mandrel head 83 and more particularly outwardly tapering shoulder 103 (see FIGS. 8 and 21), outwardly expand blind end 63 of blind rivet 33 into the adjacent countersink 43 of the blind side workpiece 37. Further pulling through of mandrel head 83 causes rivet body to laterally expand and fill up hole 45 (see FIG. 2) of workpieces 37 in an interference fit manner and at the same time the mandrel head folds, it remains intact as 83' and is extracted from the rivet. The frusto-conical shapes of the countersinks and rivet flange, the outwardly expanded cup-like shape of the blind end of the rivet body, and the preferred dimensional relationships specified herein, further cause a desirable axial compression and shortening of blind rivet 33 so as to cinch and tightly fasten together workpieces 37 at the riveted joint. Blind end 63 of blind rivet 33 is located flush or below flush (as shown) of the blind surface 41 of the corresponding workpiece 37 after rivet setting with an expanded, cup-like shape of through-bore 59 caused by the rivet setting.

Moreover, ribs 111 (see FIG. 8) gouge and indent axially elongated grooves 221 into the expanded tail end 63 of rivet 33, but without any significant severing of rivet body 33. These ribs cause a further outward bulging and splaying of blind end 63 between grooves 221 such as to form a shamrock-like pattern. This also creating more concentrated compression points at the grooved areas of the rivet body prior to lateral compression and compaction of ribs 111, shoulder 103 and lip 123 (again see FIG. 8) during complete pull through of mandrel 81 relative to blind rivet 33. Furthermore, the rib and shoulder configuration stretches out the thinning areas of blind end 63 of the rivet during setting. The post-rivet setting configuration of mandrel 81, showing the laterally folded and axially elongated head deformation, can be observed in FIG. 25.

Figure 23:
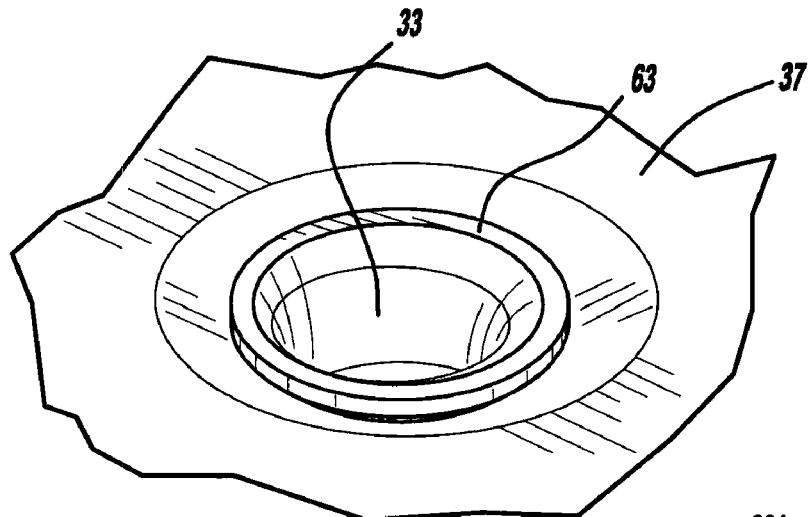
FIG. 23 is a perspective view showing the first alternate embodiment blind rivet assembly, after rivet setting.
Figure 24:
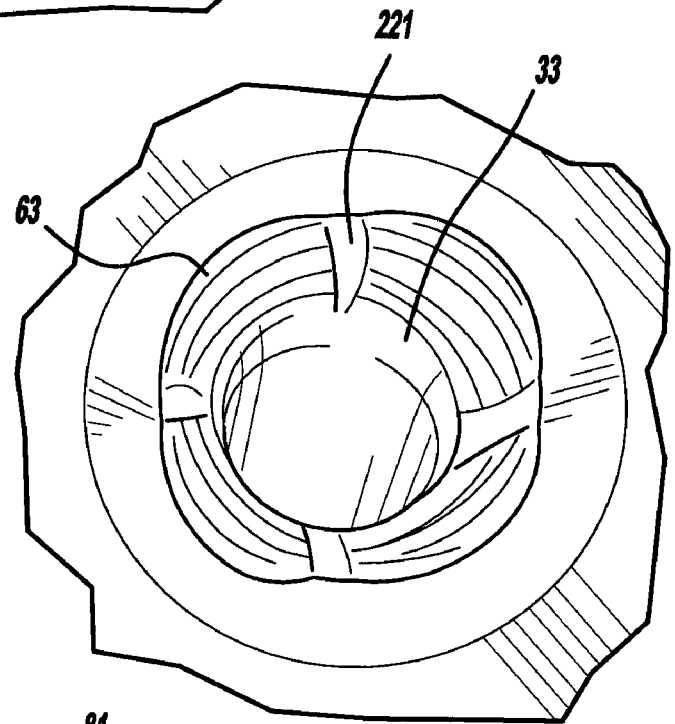
FIG. 24 is a blind end elevational view showing the preferred embodiment blind rivet assembly slightly exaggerated, after rivet setting.
Figure 25:
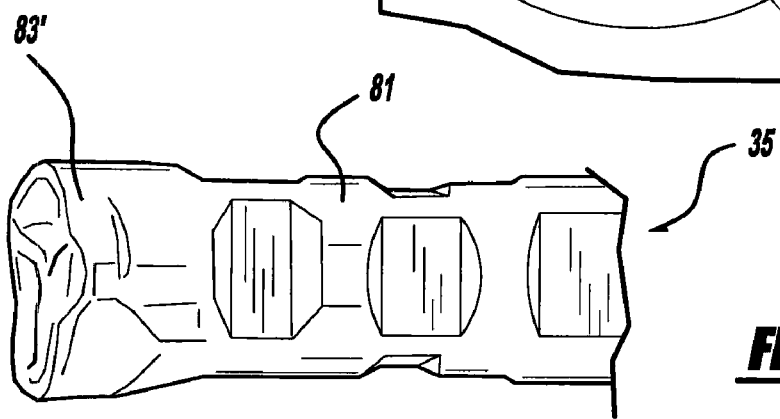
FIG. 25 is a perspective view showing the mandrel employed in the preferred embodiment blind rivet assembly, after rivet setting.

FIG. 23 shows the set condition of blind end 63 of rivet 33 using the alternate mandrel 35a shown in FIG. 10. This embodiment is otherwise similar to that of FIGS. 27 and 28 except that no rib-created grooves nor shamrock pattern are created.

Figure 29:
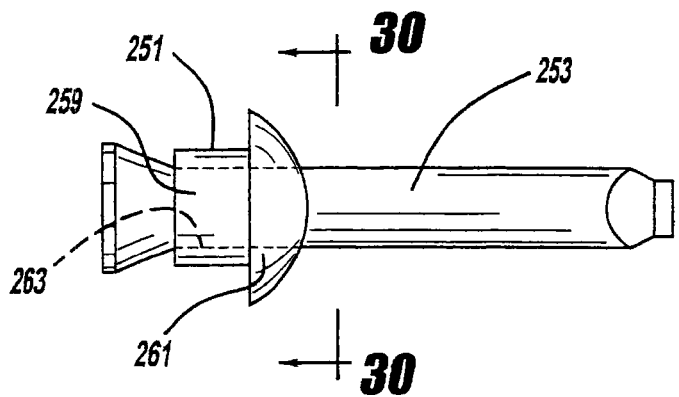
FIG. 29 is a side elevational view showing a tenth alternate embodiment blind rivet assembly, prior to rivet setting.
Figure 30:
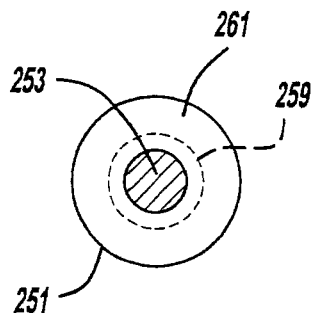
FIG. 30 is a cross-sectional view, taken along line 30-30 of FIG. 29, showing the tenth alternate embodiment rivet assembly, prior to rivet setting.
Figure 31:
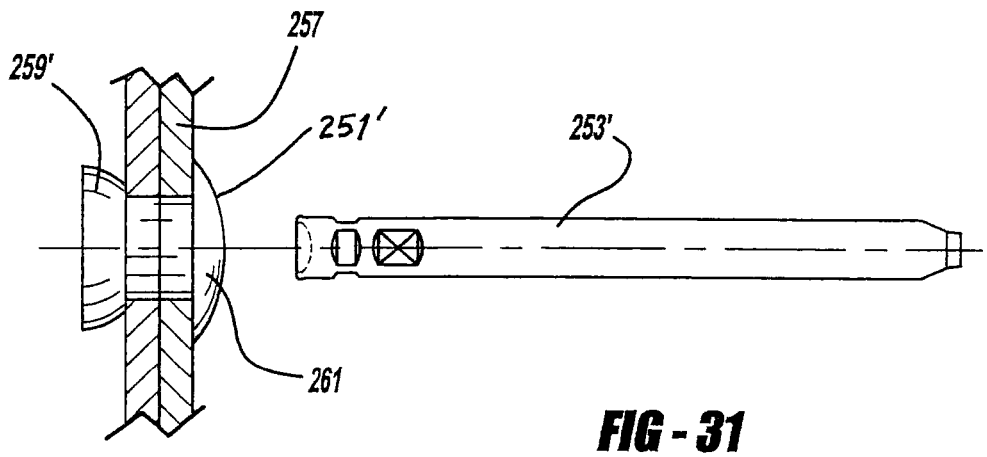
FIG. 31 is a partially fragmented, side elevational view showing the tenth alternate embodiment blind rivet assembly, after rivet setting.

Referring to FIGS. 29-31, another alternate embodiment blind rivet assembly 251 of the present invention employs a mandrel 253, blind rivet 255 and workpiece 257. Mandrel 253 is like any of the mandrel embodiments previously disclosed hereinabove, including having a tapered shoulder with optional ribs. Blind rivet 251, however, has a circular-cylindrical body 259 and an arcuately domed or pan-head type tool-side flange 261. A constantly dimensioned through-bore 263 extends through the entire blind rivet 251. Blind rivet 251 and mandrel 253 are made from aluminum but may also be steel. Furthermore, workpieces 257 are aircraft panels but may alternately be other components. During rivet setting, a setting tool completely pulls mandrel 253 through rivet 251 such that a blind end of rivet body 259 is outwardly deformed into a cup-like shape but not axially severed. The head of mandrel 253 is folded but not broken from the stem, like the previously disclosed mandrel embodiments.

Figure 32:
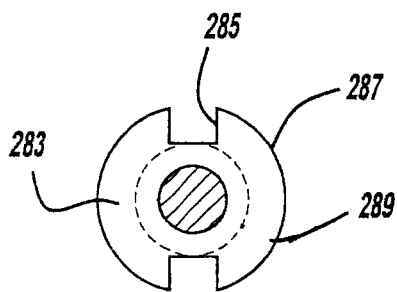
FIG. 32 is a cross-sectional view, taken along line 30-30 of FIG. 29, showing an eleventh alternate embodiment rivet assembly, prior to rivet setting.

FIG. 32 illustrates yet another blind rivet assembly embodiment. This blind rivet assembly 281 includes a mandrel like any of those previously disclosed hereinabove. A blind rivet 283 is like that shown in FIG. 29 except a pair of opposed slots 285 radially extend inward from a periphery 287 of tool-side flange 289. Flange 289 is otherwise arcuately domed with a flat underside adjacent the rivet body, like that of FIG. 29.

The set blind rivet 283 is employed to temporarily hold the aircraft workpieces together and thereafter drilled out or otherwise removed from the workpieces. Slots 285 assist in reducing curling drilled debris from the rivet otherwise interfering with the removal of the rivet or undesirably contaminating the component. For both of the embodiments of FIGS. 29-32, the pull-through and unsevered mandrel advantageously prevents the need to find traditional severed mandrel heads from the fastened components or factory. Nevertheless, it should be appreciated that the blind rivet embodiments of FIGS. 29-32 do not achieve many of the desired advantages of the flush-style embodiments of the present invention.

While various embodiments of the present invention blind rivet assembly have been disclosed, it should be appreciated that other configurations may be employed. For example, more or less ribs can be provided although various advantages of the present invention may not be realized. Furthermore, any of the mandrel configurations disclosed herein can be mixed and matched with others depending upon the specific characteristics of the riveted joint desired although various advantages of the present invention may not be achieved. Moreover, alternate mandrel stem depressions and shapes can be used although various advantages of the present invention may not be achieved. While specific dimensional relationships are preferred, it should be appreciated that other dimensions may be used but that many of the advantages may not be achieved. It is intended by the following claims to cover these and any other departures from the disclosed embodiments which fall within the true spirit of this invention.

The invention claimed is:

1. A rivet assembly comprising:

at least one workpiece having a first outer surface and an opposite second outer surface, a first countersink located in the first outer surface and a second countersink located in the second outer surface, and the countersinks being connected by a through-hole;

a blind rivet comprising a body and a tool-side flange, the body including a smooth cylindrical outside surface from the flange to a blind end prior to rivet setting, and a surface of the flange tapering outwardly from the outside surface of the body; and a mandrel comprising an elongated stem and a head, the stem extending through the rivet prior to setting, the head being laterally larger than the stem prior to rivet setting, the stem of the mandrel being smooth between the rivet and a mandrel tip prior to setting, and an outwardly tapering shoulder located on the mandrel between the head and the stem prior to rivet setting;

the head being completely pulled through the rivet during rivet setting without severing the mandrel;

the mandrel head including a depression located below a nominal tail end prior to rivet setting, the depression allowing lateral compression of the head during the pulling through of the head during setting; and the flange of the rivet being located substantially flush or below flush of the first outer surface and in the first countersink after rivet setting, a blind end of the rivet being expanded by the mandrel substantially flush or below flush of the second outer surface and into the second countersink after rivet setting, and a cylindrical center section of the rivet spacing apart the flange and the expanded blind end sections of the rivet after rivet setting;

wherein the pulling through of the head and shoulder during setting causes the blind end of the rivet body to outwardly expand into the adjacent countersink and radially expand the rivet body to completely fill the through-hole.

2. The rivet assembly of claim 1, wherein the depression in the mandrel head has a concave shape prior to rivet setting.

3. The rivet assembly of claim 1, wherein a deepest point of the depression is at a center of the mandrel head.

4. The rivet assembly of claim 1, wherein a deepest point of the depression in the mandrel head is longitudinally in a section associated with the tapering shoulder of the mandrel.

5. The rivet assembly of claim 1, wherein the at least one workpiece includes a pair of electrical device components.

6. The rivet assembly of claim 1, wherein the at least one workpiece includes a computer housing, and the mandrel head includes a lip of axial thickness prior to rivet setting.

7. The rivet assembly of claim 1, wherein the shoulder of the mandrel includes two differently angled, substantially frusto-conical, tapered surfaces.

8. The rivet assembly of claim 1, wherein the shoulder of the mandrel has a curved, tapered shape when viewed from a side of the mandrel.

9. The rivet assembly of claim 1, wherein an outside diameter of the mandrel head is equal to or between 3.5 mm and 2.9 mm before rivet setting.

10. The rivet assembly of claim 1, wherein an axial thickness of the mandrel head, not including the shoulder, is equal to or less than 1.0 mm before rivet setting, and a nominal angle of the mandrel shoulder adjacent the head is equal to or between 110° and 90° as measured from one side to the other of the shoulder before rivet setting.

11. The rivet assembly of claim 1, further comprising a setting tool operably setting the blind rivet to the workpiece from a single side of the workpiece, the setting tool comprising at least one jaw operably pulling the mandrel stem and a nosepiece operably abutting against the tool-side flange, and a piston of the tool operably causing the mandrel to be pulled through the rivet, the mandrel being discarded after setting.

12. The rivet assembly of claim 1, wherein 1,500 newtons of force or less are used to pull the mandrel through the rivet during rivet setting.

13. A rivet assembly comprising:

a blind rivet comprising an outwardly tapering tool end, an opposite blind end, and a rivet body between the ends, the tool end having a greater wall thickness as compared to a wall thickness of the adjacent rivet body, the rivet including a bore extending through the entire rivet; and a mandrel comprising a stem and a head, the stem being located in the bore of the rivet in an interference fit manner prior to rivet setting;

the mandrel head comprising a cavity located below a nominal blind end thereof;

the mandrel further comprising a shoulder which laterally enlarges from the stem to the mandrel head;

the head of the mandrel being configured for completely pulling through the rivet during rivet setting without severing the mandrel, and the rivet being unsevered during rivet setting; and the set rivet including a cylindrical center section located between the outwardly tapering tool end section and the outwardly enlarged blind end section of the rivet;

wherein the shoulder of the mandrel further comprises a first surface located adjacent the stem and at least a second and distinct surface located between the first surface and a lip of the head, the surfaces of the shoulder being coaxially aligned and each being cross-sectionally circular prior to rivet setting; and wherein the first and second surfaces of the shoulder of the mandrel include two differently angled and substantially frusto-conical, tapered surfaces.

14. The rivet assembly of claim 13, wherein the second surface of the shoulder is closer to perpendicular to a central mandrel axis as compared to the first surface.

15. The rivet assembly of claim 13, wherein at least one of the surfaces of the shoulder of the mandrel has a frusto-conical, tapered shape.

16. The rivet assembly of claim 13, wherein at least one of the surfaces of the shoulder of the mandrel has a curved, tapered shape when viewed from a side of the mandrel.

17. The rivet assembly of claim 13, further comprising workpieces fastened together by the rivet, the workpieces including a countersink in a blind side thereof and a countersink in a tool side thereof, the ends of the rivet being located in the respective countersinks in a substantially flush or below flush condition after rivet setting.

18. The rivet assembly of claim 13, wherein the cavity in the mandrel head has a concave shape prior to rivet setting.

19. The rivet assembly of claim 13, wherein a deepest point of the cavity is at a center of the mandrel head and the cavity assists in collapsing of the mandrel head during rivet setting.

20. The rivet assembly of claim 13, wherein a deepest point of the cavity in the mandrel head is longitudinally in a section associated with the shoulder of the mandrel.

21. The rivet assembly of claim 13, wherein:

an outside diameter of the mandrel head is equal to or between 3.5 mm and 2.9 mm before rivet setting; and an axial thickness of the mandrel head, not including the shoulder, is equal to or less than 1.0 mm before rivet setting, and a nominal angle of the mandrel shoulder adjacent the head is equal to or between 110° and 90° as measured from one side to the other of the shoulder before rivet setting.

22. A rivet assembly comprising:

a blind rivet comprising an outwardly tapering tool end, an opposite blind end, and a rivet body between the ends, the tool end having a greater wall thickness as compared to a wall thickness of the adjacent rivet body; and a mandrel comprising a stem and a head, the mandrel further comprising a shoulder including at least one tapering surface which laterally enlarges from the stem to the mandrel head before rivet setting;

the mandrel head including a surface depressed below a nominal tail end thereof, a deepest point of the depressed surface being at an end view center of the mandrel head and a deepest point of the depressed surface being longitudinally adjacent a section associated with the tapering shoulder of the mandrel in a side view before rivet setting;

wherein an outside diameter of the mandrel head is equal to or between 3.5 mm and 2.9 mm before rivet setting;

wherein a nominal angle of the mandrel shoulder adjacent the head is equal to or between 110° and 90° as measured from one side to the other of the shoulder before rivet setting;

the head of the mandrel being configured for completely pulling through the rivet during rivet setting without severing the mandrel, and the depressed surface allowing deformation of the head of the mandrel during the head pulling through the blind rivet; and 1,500 newtons of force or less are used to pull the mandrel through the rivet during rivet setting.

23. The rivet assembly of claim 22, further comprising workpieces fastened together by the rivet, the workpieces including a countersink in a blind side thereof and a countersink in a tool side thereof, the ends of the rivet being located in the respective countersinks in a substantially flush or below flush condition after rivet setting.

24. The rivet assembly of claim 23, wherein the at least one workpiece includes a pair of electrical device components.

25. The rivet assembly of claim 22, wherein at least one tapering surface of the mandrel shoulder further comprises a first surface located adjacent the stem and a second and distinct surface located between the first surface and a lip of the head, the surfaces of the shoulder being coaxially aligned and each being cross-sectionally circular prior to rivet setting.

* * * * *